United States Patent [19]

Mäkelä et al.

[11] Patent Number: 4,991,628
[45] Date of Patent: Feb. 12, 1991

[54] VALVE SYSTEM, E.G. FOR ANALYZERS

[75] Inventors: Keijo Mäkelä; Mikko A. Miettinen, both of Espoo; Arto J. Juslin, Kellokoski, all of Finland

[73] Assignee: Kone OY, Finland

[21] Appl. No.: 564,704

[22] Filed: Aug. 7, 1990

Related U.S. Application Data

[63] Continuation of Ser. No. 334,709, Apr. 6, 1989, abandoned.

[30] Foreign Application Priority Data

Apr. 15, 1988 [FI]  Finland ................................ 881778

[51] Int. Cl.$^5$ .............................................. F16K 7/04
[52] U.S. Cl. ............................................. 137/884; 251/7
[58] Field of Search ................... 137/269, 884, 870; 251/4, 7, 129.15, 129.17

[56] References Cited

U.S. PATENT DOCUMENTS 4,425,116  1/1984  Bilstad et al. ................. 251/7 X
4,607,526  8/1986  Bachenheimer et al. ... 251/129.17 X

FOREIGN PATENT DOCUMENTS 76375  5/1982  Japan ..................................... 251/4

Primary Examiner—John C. Fox
Attorney, Agent, or Firm—Lerner, David, Littenberg, Krumholz & Mentlik

[57] ABSTRACT

A valve system, applicable for instance to analyzers, consists of a plurality of electromagnetically operating clamp valves, purposed to unclamp and/or clamp an elastic tube passing through the valve, thereby respectively turning on or shutting off fluid flow in said tube. The apparatus comprises a magnet table carrying a plurality of electromagnets, a cover part adjacent the magnet table carrying closing pegs movable with the aid of the electromagnets, and a tube cassette between the magnet table and the cover part, in which cassette the tubes may be disposed in a given array for the functions of the analyzer.

7 Claims, 1 Drawing Sheet

VALVE SYSTEM, E.G. FOR ANALYZERS

This is a continuation of application Ser. No. 334,709 filed Apr. 6, 1989 now abandoned.

BACKGROUND OF THE INVENTION (a) Field of the Invention

The present invention concerns a valve apparatus, applicable for instance to analyzers, consisting of a plurality of electromagnetically operating clamp valves, purposed to unclamp and/or clamp an elastic tube passing through the valve and thus respectively to turn on or off the fluid flow in said tube.

(b) Description of the Related Art

In analyzers individual clamp valves are commonly used. Tubes are individually inserted in the mouth of such valves. If the analyzer requires the use of numerous clamp valves and tubes to be inserted therein, such insertion causes difficulties in cramped sites. An additional problem with such individual clamp valves is the chance of erroneous tube installation.

SUMMARY OF THE INVENTION

The object of the present invention is to reduce the above-mentioned drawbacks of the prior art. The valve apparatus of the invention comprises a magnet table provided with a plurality of electromagnets, a cover part adjacent to the magnet table, such cover part carrying closing pegs movable with the aid of the electromagnets, and a tube cassette between the magnet table and the cover part, in which tube cassette the tubes may be disposed in a given array. The present invention simplifies the insertion of tubes in awkward and cramped locations and reduces the possibility of errors since the tube cassette is predesigned and the tubes may be inserted before it is installed in place. To change tubes, it is merely necessary to change the cassette. Thereby maintenance and operation costs are considerably reduced.

In an embodiment of the invention the closing pegs are so attached to the cover part that the attachment permits the movement of the peg, and the closing pegs follow along with the cover part when the valve system is opened. The tube cassette is therefore easily exchangeable. When the cover part is closed, the pegs fall into register with the required accuracy. The design of the peg is such that when the magnet is energized, the movement of the peg is limited by face of the magnet and therefore the tolerance of the tube clamped is exclusively determined by the dimensional tolerances of the peg.

In a further embodiment of the invention the electromagnets are countersunk and/or sealed in the magnet table so that the top surface of the magnet table is substantially planar. In such embodiment the magnet table is easy to clean, especially in the event of leakage of any one of the tubes. The magnets may be partly projected but, nevertheless, so sealed to the table that any leaks if such should occur will not be deleterious.

A further embodiment of the invention provides that the closing pegs in the cover part consist of cylindrical bodies each provided with a groove for engaging the respective tube and said grooves having on their bottom a detent transversal to the tube, such as an axle pin, clamping closed the tube when the electromagnet attracts the closing peg. Therefore, simple and advantageous closing pegs are provided which hold the tubes positively in their grooves and therefore, the pegs are reliable in operation.

In a further embodiment of the invention the tube cassette has apertures corresponding to the closing peg in which the closing pegs may move. In a still further embodiment of the invention, between such apertures there are grooves for the tubes, in which the tubes can be disposed in a given array. At the installation, the closing pegs fall accurately into register with the tubes installed in the tube cassette.

BRIEF DESCRIPTION OF THE DRAWINGS

Further objects, features and advantages of the invention will become apparent to those skilled in the art from the following description thereof when taken in conjunction with the accompanying drawings in which.

DESCRIPTION OF THE PREFERRED EMBODIMENTS

Figure 1:
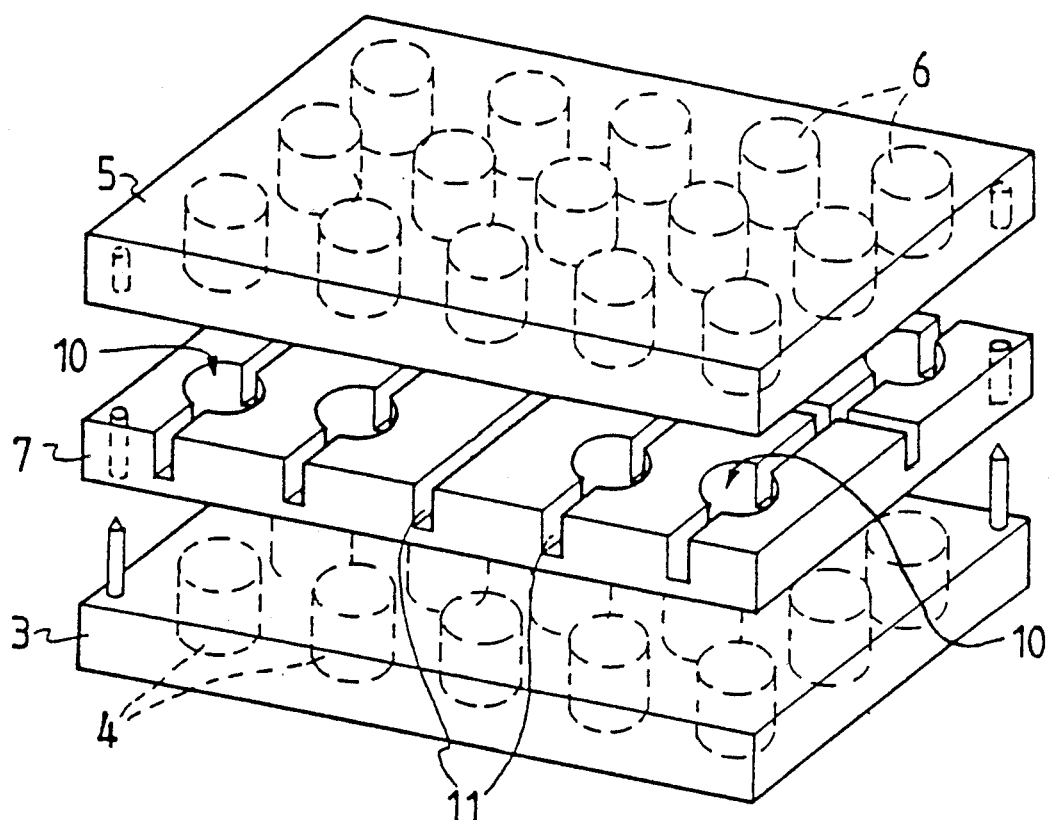
FIG. 1 presents the valve apparatus of the present invention, in exploded view.
Figure 2:
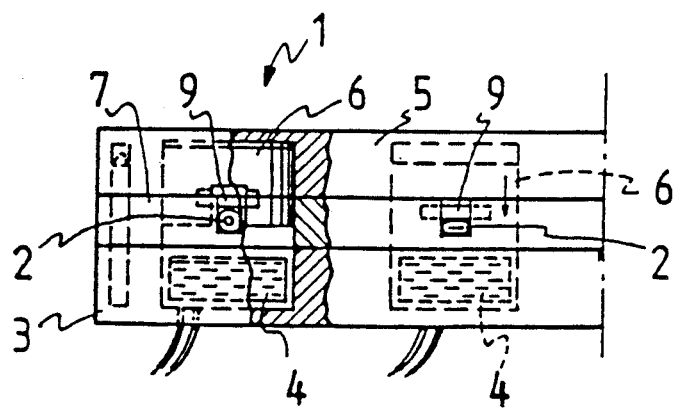
FIG. 2 is a partly cross-sectional side view of the site of one closing peg of the invention.
Figure 3:
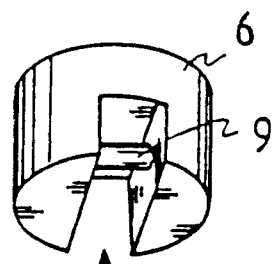
FIG. 3 presents an embodiment of the closing peg viewed obliquely from below.

The valve system of the present invention consists of a plurality of electromagnetically operating clamp valves 1 clamping closed a rubber or plastic tube 2 passing through the valve and thereby shutting off the flow present in said tube. The system comprises a magnet table 3 provided with several electromagnets 4. Above the magnet table 3 is placed a cover part 5 provided with closing pegs 6 movable with the aid of the electromagnets 4. Between the magnet table 3 and the cover part 5 is placed a tube cassette 7, wherein the tubes 2 are arranged in a given array for the functions of the analyzer. The electromagnets 4 are so countersunk in the magnet table 3 that the top surface of the magnet table is unbroken and smooth, as shown in FIG. 1. The closing pegs 6 in the cover part 5 consist of cylindrical bodies with grooves 8 made for surrounding part of the tubes. The grooves 8 have on their bottom an axle pin 9 transversal to the tube 2, capable of clamping closed the tube 2 when the electromagnet 4 attracts the closing peg 6. The tube cassette 7 is provided with cylindrical apertures 10 in which the closing pegs 6 may move. Between the apertures 10 there are grooves 11 made for the tubes 2, wherein the tubes can be disposed in a given array.

It will be obvious to a person skilled in the art that the scope of the invention is not restricted to the embodiments disclosed above, but may instead be varied within the scope of the following claims without departing from the spirit and scope of the invention. For example, the pegs 6 and the electromagnets 4 may be of a type other than that described in the foregoing, such as for instance a U-shaped magnet and an elongated peg. The cassette 7 may, for example, be produced by a technique other than excavating a groove, by for instance applying a casting mould instead. The cassette and the table may, for example, be integral, wherein the tubes are provided in grooves in the magnet table.

We claim:

1. A valve apparatus including a plurality of electromagnetically operating clamp valves for unclamping and/or clamping elastic tubes passing through said clamp valves and thus respectively permitting or preventing fluid flow in one or more of said tubes, said apparatus comprising: a magnet table provided with a plurality of electromagnets; a cover adjacent to said magnet table having disposed therein a plurality of closing pegs aligned and cooperatively associated with said electromagnets, said closing pegs being movable by means of said electromagnets to clamp or unclamp said tubes; and a tube cassette disposed between said magnet table and said cover, said tube cassette being adapted to maintain said tubes in a given array.

2. A valve apparatus according to claim 1, wherein said closing pegs are disposed within said cover in a manner such that said closing pegs are slidably movable by means of said cooperatively associated electromagnets.

3. A valve apparatus according to claim 1 wherein said electromagnets are countersunk and/or sealed in the magnet table such that the top surface of the magnet table is substantially planar.

4. A valve apparatus according to claim 2 wherein each of said closing pegs disposed in said cover consists of a cylindrical body provided at one end with a groove for surrounding part of a respective one of said tubes, and each of said grooves has in the bottom thereof a detent transverse to said groove, capable of clamping closed a respective tube when the cooperatively associated electromagnet aligned therewith attracts said closing pegs.

5. A valve apparatus according to claim 1, wherein said tube cassette has apertures, each of which corresponds to a respective one of said closing pegs, in which said closing pegs may move.

6. A valve apparatus according to claim 5, wherein said apertures in said tube cassette are connected by grooves for receiving said tubes in a given array.

7. A valve apparatus according to claim 1 wherein said closing pegs are cooperatively attached to said cover and retained by said cover upon the removal of said cover from said valve apparatus.

* * * * *